United States Patent
Lev et al.

(10) Patent No.: US 10,819,737 B2
(45) Date of Patent: Oct. 27, 2020

(54) SENSORS FOR DETECTING IT OPERATIONS

(71) Applicant: NEC Corporation Of America, Herzlia (IL)

(72) Inventors: Tsvi Lev, Tel-Aviv (IL); Yaacov Hoch, Ramat-Gan (IL); Moshe Karako, Kiryat-Ono (IL)

(73) Assignee: NEC Corporation of America, Herzlia (IL)

( * ) Notice: Subject to any disclaimer, the term of this patent is extended or adjusted under 35 U.S.C. 154(b) by 183 days.

(21) Appl. No.: 16/049,950

(22) Filed: Jul. 31, 2018

(65) Prior Publication Data

US 2019/0036964 A1    Jan. 31, 2019

Related U.S. Application Data

(60) Provisional application No. 62/538,844, filed on Jul. 31, 2017.

(51) Int. Cl.
    *H04L 29/06*    (2006.01)

(52) U.S. Cl.
    CPC .......... *H04L 63/1441* (2013.01); *H04L 63/10* (2013.01); *H04L 63/1416* (2013.01); *H04L 63/1491* (2013.01); *H04L 63/1483* (2013.01)

(58) Field of Classification Search
    CPC . H04L 63/1441; H04L 63/10; H04L 63/1416; H04L 63/1491; H04L 63/1483; H04L 29/06
    See application file for complete search history.

(56) References Cited

U.S. PATENT DOCUMENTS

| 7,890,483 | B1* | 2/2011 | Aaron | H04L 67/12 707/705 |
| 9,350,750 | B1* | 5/2016 | Aval | H04L 63/1416 |
| 9,697,355 | B1* | 7/2017 | Park | G06F 21/552 |
| 10,257,295 | B1* | 4/2019 | Alpert | H04L 67/22 |
| 2006/0130139 | A1* | 6/2006 | Sobel | H04L 63/20 726/22 |
| 2007/0200664 | A1* | 8/2007 | Proska | G08G 1/205 340/5.42 |
| 2012/0084349 | A1* | 4/2012 | Lee | G06Q 30/02 709/203 |
| 2015/0358360 | A1* | 12/2015 | Bezilla | G06F 21/552 726/1 |
| 2017/0270295 | A1* | 9/2017 | Park | G06F 21/552 |
| 2018/0004948 | A1* | 1/2018 | Martin | G06F 21/566 |
| 2018/0220301 | A1* | 8/2018 | Gallagher | H04L 9/0894 |

* cited by examiner

*Primary Examiner* — Jayesh M Jhaveri (57) ABSTRACT

A computer implemented method of correlating between detected usage events indicative of using client terminals and an operational state of physical interfaces of the client terminals, comprising monitoring a network in a monitored location to detect one or more usage events indicating of a usage of one or more of a plurality of client terminals operatively connected to the network, obtaining sensory data from one or more interface monitoring sensors having a fixed operation which is unmodifiable after deployed to capture an operational state of one or more physical interfaces of the client terminal(s), analyzing the sensory data to identify the operational state of the physical interface(s), correlating between the usage event(s) and the identified operational state to validate the usage event(s) and initiating one or more action according to the validation.

22 Claims, 2 Drawing Sheets

SENSORS FOR DETECTING IT OPERATIONS

RELATED APPLICATIONS

This application claims the benefit of priority under 35 USC § 119(e) of U.S. Provisional Patent Application No. 62/538,844 filed on Jul. 31, 2017, the contents of which are incorporated herein by reference in their entirety.

BACKGROUND OF THE INVENTION

The present invention, in some embodiments thereof, relates to validating usage events related to using client terminals deployed in a monitored location, and, more specifically, but not exclusively, to validating usage events related to using client terminals by correlating between the usage events and operational state of physical interfaces of the client terminals.

Cyber-attacks and cybercrime present a major and ever growing concern for any organization reliant on Information Technology (IT).

Of the various types of attacks, those termed "Advanced Persistent Threats" are particularly difficult to prevent or detect. They revolve around the potential attacker first gaining access to one machine inside the organization network through one or more techniques, for example, a Phishing attack, a malicious web page code and/or the like.

Once control of one machine is achieved, the attacker may study the IT network, looking for security loopholes in other machines and trying to gain access to network resources, to user passwords, credentials and/or the like. This phase may take hours, days or months and is particularly difficult to detect since the malicious operations may be done inside the organization network with seemingly authorized access.

SUMMARY OF THE INVENTION

According to a first aspect of the present invention there is provided a computer implemented method of correlating between detected usage events indicative of using client terminals and an operational state of physical interfaces of the client terminals, comprising:
  Monitoring a network in a monitored location to detect one or more usage events indicating of a usage of one or more of a plurality of client terminals operatively connected to the network.
  Obtaining sensory data from one or more interface monitoring sensors deployed to capture an operational state of one or more physical interfaces of one or more of the client terminals. The one or more interface monitoring sensors having a fixed operation which is unmodifiable after the deployment.
  Analyzing the sensory data to identify the operational state of one or more of the physical interfaces.
  Correlating between the one or more usage events and the identified operational state to validate the one or more usage events.
  Initiating one or more action according to the validation.

Correlating between two completely separate domains, i.e. the usage event(s) detected by monitoring the network and the operational state of the physical interface(s) of the used client terminal(s) may significantly improve detection of potential cyber security threats, risks and/or attacks. Moreover, correlating between the detected usage event(s) and the captured actual operational state of the respective physical interface(s) of the used client terminal(s) may significantly improve characterization of the usage event(s) to improve detection of real invalid usage events while reducing false positive detections in which valid access events may be classified as invalid. In addition, since many cyber-attacks may be initiated either from remote locations and/or using automated software application executing at the accessed (attacked) client terminal, determining that the identified operational state may not allow the detected usage event (negative correlation) may significantly increase the certainty that the detected usage event is a malicious one.

Also comparing between the operational state of the physical interface(s) of the accessed client terminal correlated with the detected usage event(s) and the predefined operational state rules may allow detection of unordinary, suspicious and/or unauthorized operational states of the physical interface(s) of the client terminal(s), in particular changes in the operational states. Furthermore, as the interface monitoring sensor(s) may not be reprogrammable after deployed, i.e. in real-time, the interface monitoring sensor(s) may be highly protected from malicious parties, e.g. a malicious user, a malicious agent and/or the like which may attempt altering their operation.

According to a second aspect of the present invention there is provided a system for correlating between detected usage events indicative of using client terminals and an operational state of physical interfaces of the client terminals, comprising one or more interface monitoring sensors deployed in a monitored location to capture an operational state of one or more physical interfaces of one or more of a plurality of client terminals in a monitored location and one or more processors connected to a network connecting the plurality of client terminals and the one or more interface monitoring sensors having a fixed operation which is unmodifiable after the deployment. The one or more processors are adapted to execute code, the code comprising:
  Code instructions to monitor the network to detect one or more usage events indicating of a usage of one or more of the plurality of client terminals;
  Code instructions to obtain sensory data from the one or more interface monitoring sensors;
  Code instructions to analyze the sensory data to identify the operational state of one or more of the physical interfaces;
  Code instructions to correlate between the one or more usage events and the identified operational state to validate the one or more usage events; and
  Code instructions to initiate one or more actions according to the validation.

According to a third aspect of the present invention there is provided a software program product correlating between detected usage events indicative of using client terminals and an operational state of physical interfaces of the client terminals, comprising:
  A non-transitory computer readable storage medium.
  First program instructions for monitoring a network in a monitored location to detect one or more usage events indicating of a usage of one or more of a plurality of client terminals operatively connected to the network.
  Second program instructions for obtaining sensory data from one or more interface monitoring sensors deployed to capture an operational state of one or more physical interfaces of the one or more client terminals. The one or more interface monitoring sensors having a fixed operation which is unmodifiable after the deployment.

Third program instructions for analyzing the sensory data to identify the operational state of one or more of the physical interfaces.

Fourth program instructions for correlating between the one or more usage events and the identified operational state to validate the one or more usage events.

Fifth program instructions for initiating one or more actions according to the validation;

Wherein the first, second, third, fourth and fifth program instructions are executed by one or more processors from the non-transitory computer readable storage medium.

In a further implementation form of the first, second and/or third aspects, the plurality of client terminals are operatively connected to a first network and the one or more interface monitoring sensors are operatively connected to a second network which is isolated from the first network. By physically separating (isolating) the interface monitoring sensors network from the network deployed in the monitored location for use by the client terminals and/or by the network resources, the interface monitoring sensors may be further protected from hacking as they may reside on a closed network segment having no and/or limited accessibility from remote locations.

In an optional implementation form of the first, second and/or third aspects, the one or more interface monitoring sensors employ one or more secure communication protocols to authenticate a validity of the sensory data. By employing the secure communication protocol(s) the interface monitoring sensor(s) may be significantly protected from unauthorized accesses which may present potential (cyber) security threats. The possibility to hack the interface monitoring sensors may therefore be significantly reduced and/or eliminated completely.

In an optional implementation form of the first, second and/or third aspects, the one or more interface monitoring sensors employ one or more proprietary communication protocols. By employing the proprietary communication protocol(s) which may not be in general use the interface monitoring sensor(s) may be further protected from unauthorized accesses which may present potential (cyber) security threats.

In a further implementation form of the first, second and/or third aspects, the correlation is done by comparing spatiotemporal data relating to the one or more usage events with the spatiotemporal data relating to the identified operational state. This may allow for an accurate correlation between the usage event(s) and the operational state of the respective client terminal(s) physical interface(s) in time and space. This allows to focus on the relevant physical interface(s) of the relevant client terminal(s) to determine for a proper correlation in a certain detection time in which the usage event(s) are detected.

In a further implementation form of the first, second and/or third aspects, the validation is evaluated by analyzing the comparison to determine whether the identified operational state is indicative of the one or more usage events. Validating that the identified operational state may indeed allow the detected usage event(s) is a key feature to validate whether the detected usage event(s) are actually initiated locally using the physical interface(s) of the used client terminal(s).

In a further implementation form of the first, second and/or third aspects, the validation is evaluated by comparing the identified operational state to one or more predefined operational state rules to determine whether the identified operational state is valid. Comparing the operational state to predefined operational state rules may allow to easily identify valid operational states which may be applied by legitimate users as well as identify invalid operational states which may be applied by potentially malicious users.

In an optional implementation form of the first, second and/or third aspects, one or more usage events are detected in which one or more network resource are accessed via the one or more client terminals, the one or more network resources are members of a group consisting of: a network, a storage resource, a service and an application. This may allow extending detection of usage event(s) involving network resources accessed from the client terminal(s).

In a further implementation form of the first, second and/or third aspects, the one or more usage events are members of a group consisting of: a login attempt to one or more of the client terminals, installation of a software module on one or more of the client terminals, an increase in utilization of computing resources at one or more of the client terminals and an access attempt to one or more of the network resources. Detecting a wide variety of usage event(s) may allow for efficient and comprehensive protection of the monitored location.

In a further implementation form of the first, second and/or third aspects, the physical interfaces comprise one or more members of a group consisting of: a Human-Machine Interface (HMI), an Input/Output (I/O) interface and a mechanical interface. Covering all physical interfaces of the client terminal(s) may significantly improve the protection coverage provided in the monitored location.

In a further implementation form of the first, second and/or third aspects, one or more of the interface monitoring sensors are integrated in one or more of the physical interface. This may allow for efficient deployment of the interface monitoring sensor(s) in the monitored location. Moreover, this may allow taking advantage of interface monitoring sensors already integrated in some of the physical interfaces.

In a further implementation form of the first, second and/or third aspects, one or more of the interface monitoring sensors are imaging sensors configured to capture at least one image depicting a visual indication of the operational state. Supporting imaging sensors may be highly desirable as the imaging sensors may provide high coverage of the monitored location. Moreover, many monitored locations (e.g. organizations, institutions, etc.) are already monitored by such imaging sensors.

In a further implementation form of the first, second and/or third aspects, one or more of the interface monitoring sensors are acoustic sensors configured to capture a sound indicative of the operational state. The acoustic sensors may provide high coverage as they may capture sounds indicative of the operational state of a plurality of physical interfaces and optionally for a plurality of client terminals. As such the deployment of the acoustic sensors may be highly beneficial.

In a further implementation form of the first, second and/or third aspects, one or more of the interface monitoring sensors are HMI monitoring sensors configured to capture the operational state of one or more HMI interfaces of the one or more client terminals. The HMI interfaces provide one of the major interfaces for accessing and/or using the client terminal(s). Therefore deploying sensors to accurately capture the operational state of the HMI interfaces is highly valuable.

In a further implementation form of the first, second and/or third aspects, one or more of the interface monitoring sensors are I/O interface monitoring sensors configured to capture the operational state of one or more I/O interfaces of the one or more client terminals. The I/O interfaces provide another major access point for accessing and/or using the client terminal(s). Therefore deploying sensors to accurately capture the operational state of the I/O interfaces is highly valuable.

In a further implementation form of the first, second and/or third aspects, one or more of the interface monitoring sensors are mechanical interface monitoring sensors configured to capture the operational state of one or more mechanical interfaces of the one or more client terminals. The mechanical interfaces provide another point of access for accessing and/or using the client terminal(s). Therefore deploying sensors to accurately capture the operational state of the mechanical interfaces is highly valuable.

In an optional implementation form of the first, second and/or third aspects, at least some of the sensory data is received from the one or more interface monitoring sensors through one or more other sensors. The one or more interface monitoring sensors generate an indication of the identified operational state. The indication is captured by the one or more other sensors which forward the indication. Relaying operational state information through an intermediate sensor may significantly reduce the effort and/or cost in deploying the at least some of the interface monitoring sensors which may not be directly connected to the network of the monitored location. Instead theses interface monitoring sensors may use simple indications which may be relayed to the central monitoring system through the intermediate sensors which are connected to the network.

In a further implementation form of the first, second and/or third aspects, the indications comprise one or more members of a group consisting of: a visual indication, an audible indication and a Radio Frequency (RF) signal indication. This may allow for high flexibility in selection of the interface monitoring sensors according to their indication abilities. In addition this may allow for flexibility in capturing the indication to be relayed to the central monitoring system.

In a further implementation form of the first, the second and/or the third aspect, physical location of one or more of the interface monitoring sensors is mapped in the monitored location. This may allow for accurate spatial correlation between the detected usage event(s) and the identified operational state of the relevant physical interfaces.

In a further implementation form of the first, the second and/or the third aspects, a physical location of one or more of the client terminals is mapped in the monitored location. This may allow for accurate spatial correlation between the detected usage event(s) and the identified operational state of the relevant physical interfaces.

In a further implementation form of the first, second and/or third aspects, the one or more actions are members of a group consisting of: generating an alert, preventing the usage of the one or more client terminal, preventing an access to one or more network resource and invoking a deception measure. This may allow for flexibility in configuring the monitoring system to take one or more actions as required in different monitored locations.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced In the drawings.

DETAILED DESCRIPTION

The present invention, in some embodiments thereof, relates to validating usage events related to using client terminals deployed in a monitored location, and, more specifically, but not exclusively, to validating usage events related to using client terminals by correlating between the usage events and operational state of physical interfaces of the client terminals.

According to some embodiments of the present invention, there are provided methods, systems and computer program products for correlating between usage events indicative of using one or more client terminals located in a monitored location and an operational state of one or more physical interfaces of one or more of the client terminals in order to evaluate a validity of the usage events. The client terminals may include, for example, a processing node (e.g. a computer, a laptop, a server, a mobile device and/or any processing device) and/or the like. The client terminal(s) may be operatively connected to a network, for example, a Local Area Networks (LAN), a Wide Area Network (WAN) and/or the like for communicating with each other as well as with other internal and/or external network resources.

The physical interfaces of the client terminals may include, for example, Human Machine Interface(s) (HMI) (e.g. keyboard, pointing device, touchpad, touchscreen, display, etc.), I/O interface(s) (e.g. communication ports, expansion ports, peripheral device attachment ports, etc.) and/or mechanical interface(s) (e.g., server doors, rack drawers, laptop lids, etc.).

The monitored location may be monitored by one or more interface monitoring sensors, for example, an imaging sensor, an acoustic sensor, an HMI interface monitoring sensor, an I/O interface monitoring sensor, a mechanical interface monitoring sensor and/or the like which may capture an operational state of one or more of the physical interfaces. The operational state that may be captured by the interface monitoring sensors may include, for example, a keyboard state (typing or idle), a pointing device state (moving or idle), a touchscreen state (interacted with or idle), content of a display, a communication port state (cable plug present/inserted/ejected), a peripheral port state (peripheral device (e.g. Universal Serial Bus (USB) device, a Bluetooth dongle, etc.) present/attached/detached), a server door state (open/close), a storage rack drawer state (open/close), a laptop lid state (open/close) and/or the like.

The interface monitoring sensor(s) may not be field programmable, in particular the interface monitoring sensor(s) may not be programmable externally after deployed in the monitored location. This may prevent alterations to the operation mode of the interface monitoring sensor(s) in real time such that they may not be hacked after deployed. Typically, the interface monitoring sensor(s) may employ one or more secure and/or encrypted communication protocols, for example, a public key authentication protocol such that the communication with the interface monitoring sensor(s) may be protected and authenticated.

Optionally, while connected to the network, in particular the physical infrastructure of the network, the interface monitoring sensor(s) may employ one or more proprietary communication protocols which may significantly prevent unauthorized access to the interface monitoring sensor(s). For example, the interface monitoring sensor(s) may connect to the LAN but use a proprietary protocol which may encode the transmitted data in proprietary packets that do not follow standard network protocols such as, for example, Transmission Control Protocol/Internet Protocol (TCP/IP).

Optionally, in order to maintain isolation between the interface monitoring sensors and the client terminals as well as the network resources, the interface monitoring sensors may connect to a second network which is physically isolated, for example, segregated, separated and/or independent of the (first) network connecting the client terminals and/or the network resources. For example, the first network may be facilitated through one or more Local Area Networks (LAN), Wide Area Network (WAN) and/or the like, while the second network may include, for example, a Bluetooth network, an isolated WLAN (e.g. Wi-Fi), a Controller Area Network (CAN) bus, a serial bus, a single wire interface and/or the like.

A monitoring system connected to the network may monitor network activity on the network to detect the usage events relating to using one or more of the client terminals. Monitoring the network may further include analyzing one or more log records stored at one or more of the client terminals which may indicate of the usage event(s). The usage events may include, for example, a login attempt to the client terminal(s), installation of a software module on said at least one client terminal, an access to a service and/or an application, an increase in utilization of computing resources at the client terminal(s) and/or the like. The detected usage events may further relate to accesses to one or more network resources, for example, a network, a storage resource, a service, an application, a router, a gateway, a printer and/or the like via the client terminal(s), for example, accessing a storage resource (e.g. a database, a file, etc.), accessing a service (e.g. a local service, a cloud service, etc.), using a printer and/or the like.

The monitoring system may collect sensory data from one or more of the interface monitoring sensors. The monitoring system may collect the sensory physical interaction data continuously, periodically and/or upon detection of the access event(s). The collected sensory activity data may indicate of the operational state of the physical interface(s) of the client terminal(s).

The monitoring system may analyze the collected sensory data to identify the operational state of the physical interface(s), in particular changes in the operational state, for example, the keyboard state which may be indicative of typing on the keyboard, the pointing device state which may be indicative of a movement of the pointing device, the touchscreen state which may be indicative of interaction with the touchscreen, the communication port state which may be indicative of inserting/ejecting a cable plug, the peripheral device port state which may be indicative of attaching/detaching a peripheral device, the server door state which may be indicative of opening/closing the server door, the storage rack drawer state which may be indicative of opening/closing the storage rack drawer, a laptop lid state which may be indicative of opening/closing the laptop lid and/or the like. The monitoring system may further analyze the collected sensory data to identify the operational state of the respective client terminal. For example, the monitoring system may analyze imaging sensory data capturing the display of a certain client terminal to identify one or more operational state attributes of the respective client terminal, for example, presenting login screen, presenting a software installation progress bar and/or the like. The sensory data may typically be assigned and/or associated with temporal information, for example, a time (timing), duration, a frequency, an order, a sequence and/or the like of the identified operational state.

The monitoring system may obtain spatial information of the interface monitoring sensors, i.e. mapping information mapping a physical location of each of the interface monitoring sensors with respect to a structural layout and/or perimeter of the monitored location. Similarly, the monitoring system may obtain spatial information such as the mapping information for one or more of the client terminals such that the physical location of the client terminal(s) is known with respect to the structural layout and/or perimeter of the monitored location. The monitoring system may use the spatial information relating to the interface monitoring sensors and to the client terminals in order to associate one or more of the interface monitoring sensors with respective one or more of the client terminals.

Based on the identified operational state and the associated spatiotemporal information, the monitoring system may correlate between the detected usage event(s) and the operational state of the physical interface(s) of the client terminal(s). Based on the correlation, the monitoring system may evaluate whether to validate, authenticate and/or approve the detected usage event(s) or not in which case may be indicative of malicious usage and may thus present a potential (cyber) security threat. The validity may be based on one or more validation rules which define whether the identified operational state of the physical interface(s) may be indicative of the detected usage event(s), i.e. whether the usage associated with the detected usage event(s) can be actually conducted while the physical interface(s) are at their identified operational state.

The validation rule(s) may also define whether the usage associated with the detected usage event(s) may affect the physical interface(s) to be and/or enter (switch to) the identified operational state. The validation rules may further include rules one or more predefined operational state rules which may define allowed, prohibited and/or conditional operational states for the physical interface(s) of the client terminals(s). Optionally, one or more machine learning techniques and/or algorithms may be applied to learn of typical operational states, in particular with respect to usage event(s) in order to create predefined operational state rules to be used as basis for legitimate (valid) operational states.

Applying these validation rules, predefined operational state rule(s) and/or learned operational state rule(s), the monitoring system may evaluate the validity of the detected usage event(s) based on positive and/or negative correlation. Negative correlation relates to detected usage event(s) which cannot be correlated to the operational state of the physical interface(s) of the client terminal(s) in the monitored location. This may be indicative that the usage event(s) are initiated from a remote location and/or by automated application(s), agent(s), tool(s) and/or the like executing at the used client terminal(s) and may therefore present a potential security threat. Positive correlation relates to detected usage event(s) which may be correlated with the identified operational state of the physical interface(s) of the used client terminal(s). Furthermore, in case of positive correlation, the monitoring system may evaluate whether the identified operational state is legitimate or whether it may be unordinary, suspicious and/or unauthorized which may also be indicative of a potential security threat.

In some embodiments of the present invention, the monitored location may be an interior space (cabin) of a vehicle, for example, a car, a boat and/or the like. The monitoring system may monitor one or more networks, for example, a Controller Area Network (CAN) bus and/or the like of the vehicle connecting one or more vehicle systems, for example, a vehicle control system, a driving control system, a navigation system and/or the like to detect one or more usage events relating to usage of the vehicle system(s). One or more interface monitoring sensors such as, for example, the imaging sensor, the acoustic sensor, the HMI interface monitoring sensor, the I/O interface monitoring sensor, the mechanical interface monitoring sensor and/or the like may be deployed in the vehicle to capture an operational state of one or more physical interfaces of the vehicle, for example, a touchscreen, a driving control interface (e.g. steering wheel buttons, a light lever, an acceleration pedal, a breaking pedal etc.).

As described herein above, the monitoring system may obtain sensory data from the interface monitoring sensor(s) and analyze the sensory data to identify the operational state of the physical interfaces of the vehicle. The monitoring system may then correlate between the detected usage event(s) and the operational state of the physical interfaces of the vehicle in order to evaluate whether the usage event may be initiated by a driver of the vehicle manipulating the physical interfaces. In case the monitoring system is unable to correlate between the detected usage event(s) and the operational state of the physical interface(s) of the vehicle, the monitoring system may determine that the usage event(s) is invalid. Such invalid usage event may be triggered from a remote location and/or by one or more automated applications, agents, tools and/or the like executing in the vehicle system(s) which may be indicative of malicious usage and potentially a security threat.

According to the evaluation of the detected usage event(s), in case the monitoring system evaluates the usage event(s) is invalid and hence may present a potential security threat, the monitoring system may initiate one or more actions, for example, generate an alert to one or more users and/or automated systems, prevent the usage of the client terminal(s), prevent the access to the accessed network resource(s), invoke a deception measure to contain the usage event and/or the like.

Validating the usage events at the client terminals in the monitored location based on correlation between the detected usage events and the identified operational state of the physical interfaces of the client terminals may present significant advantages. First, typically, the client terminals (as well as the network resources) and the interface monitoring detection resources are completely isolated from each other. Therefore by correlating the two domains together, detection of potential cyber security threats, risks and/or attacks may be significantly improved.

Moreover, correlating between the detected usage event(s) and the captured actual operational state of the physical interface(s) of the used client terminal(s) may significantly improve characterization of the usage event(s) to improve detection of real invalid usage events while reducing false positive detections in which valid access events may be classified as invalid. In addition, since many cyber-attacks may be initiated either from remote locations and/or using automated software application executing at the accessed (attacked) client terminal, determining that the identified operational state may not allow the detected usage event (negative correlation) may significantly increase the certainty that the detected usage event is a malicious one. Also comparing between the operational state of the physical interface(s) of the accessed client terminal correlated with the detected usage event(s) and the predefined operational state rules may allow detection of unordinary, suspicious and/or unauthorized operational states of the physical interface(s) of the client terminal(s), in particular changes in the operational states.

Furthermore, as the interface monitoring sensor(s) may not be reprogrammable after deployed, i.e. in real-time, the interface monitoring sensor(s) may be highly protected from malicious parties, e.g. a malicious user, a malicious agent and/or the like which may attempt altering their operation. In addition, since interface monitoring sensor(s) may employ the secure and/or proprietary protocol(s) for communicating with the monitoring system, the interface monitoring sensor(s) may be significantly protected from unauthorized accesses which may present potential (cyber) security threats. The possibility to hack the interface monitoring sensors may therefore be significantly reduced and/or eliminated completely.

In addition, by physically separating (isolating) the interface monitoring sensors network from the network deployed in the monitored location for use by the client terminals and/or by the network resources, the interface monitoring sensors may be further protected from hacking as they may reside on a closed network segment having no and/or limited accessibility from remote locations.

Lastly, validation of the usage events through the correlation with the operational state may require little effort as at least some of the interface monitoring sensors used herein, for example, the imaging sensor(s) may typically be already deployed in many facilities, for example, organizations, institutions and/or the like.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
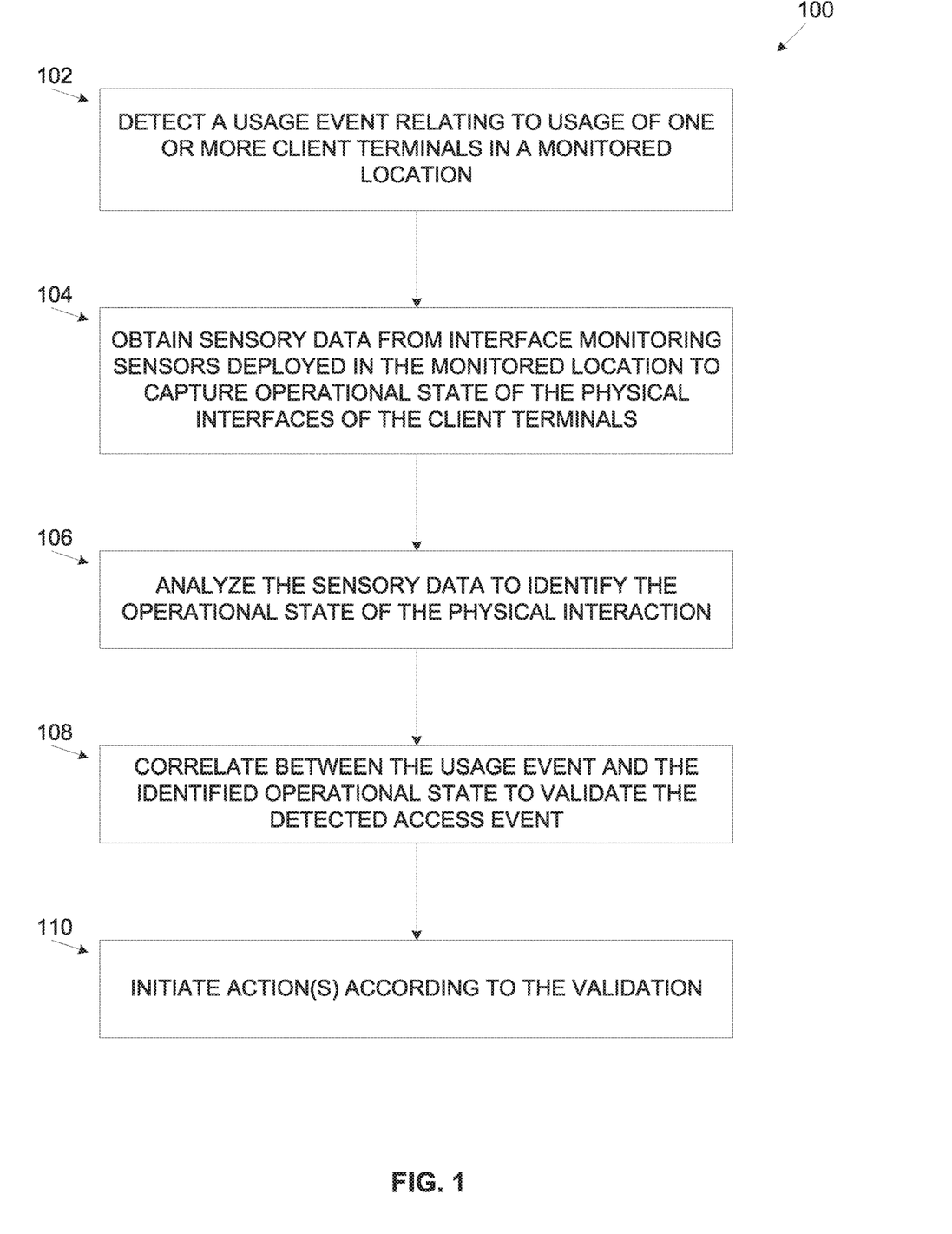
FIG. 1 is a flowchart of an exemplary process of correlating between usage events indicative of using client terminals in a monitored location and an operational state of physical interfaces of the client terminals, according to some embodiments of the present invention.

Referring now to the drawings, FIG. 1 is a flowchart of an exemplary process of correlating between usage events indicative of using client terminals in a monitored location and an operational state of physical interfaces of the client terminals, according to some embodiments of the present invention. A process 100 may be executed to correlate between usage events indicative of using one or more client terminals located in a monitored location monitored by a plurality of interface monitoring sensors and an operational state of one or more physical interfaces physical of the used client terminal(s) in order to validate the usage events. The client terminals, for example, processing nodes, computers, laptops, servers, mobile devices and/or any processing devices may communicate with each other as well as with other internal and/or external network resources (e.g. storage resources, services, applications, etc.) through a network.

The interface monitoring sensors may also connect to the network. However, the interface monitoring sensors may not be field programmable, in particular the interface monitoring sensor(s) may not be externally programmable after deployed in the monitored location. Moreover, the interface monitoring sensors may connect to the network using one or more proprietary and/or secure communication protocols which may significantly prevent unauthorized access to the interface monitoring sensor(s).

Optionally, in order to further protect the interface monitoring sensor(s), isolation may be enforced between the network connecting the interface monitoring sensors and the network connecting the client terminals as well as other network resources. In such deployment(s), the interface monitoring sensors may connect to a separate network which may be physically isolated, segregated separated and/or independent from the network connecting the client terminals and/or the network resources. A physical location of the client terminals as well as the physical location of the interface monitoring sensors may be mapped such that their location in the monitored location is known.

Usage events indicative of using one or more of the client terminals, for example, for accessing one or more of the network resources via the client terminal(s) may be detected by monitoring network traffic and/or activity on the network.

The detected usage events may include, for example, a login attempt to the client terminal(s), installation of a software module on the network resource(s), an attachment of an external device, an access and/or use of a resource, a service, an application and/or the like, an access to an I/O interface of the client terminal(s), an increase in computing resources utilization at the client terminal(s) and/or the like. The detected usage events may further include access events relating to accesses to the network resources via the client terminal(s), for example, accessing a storage resource (e.g. a database, a file, etc.), accessing a service (e.g. a local service, a cloud service, etc.), initiating and/or using and application, using a printer and/or the like.

Sensory data may be provided by one or more of the interface monitoring sensors such as, for example, an imaging sensor, an acoustic sensor, an HMI monitoring sensor, an I/O interface monitoring sensor, a mechanical interface monitoring sensor and/or the like deployed in the monitored location and connected to the second network. The interface monitoring sensors may be deployed to capture an operational state of one or more physical interfaces of the client terminal(s), in particular changes in the operational state, for example, an HMI interface, an I/O interface, a mechanical interface and/or the like. Collecting the sensory data may be done continuously, periodically and/or upon detection of one or more usage events. The sensory data may be indicative of the operational state of the physical interface(s) of the used client terminal(s), for example, a keyboard state, a pointing device state, an I/O interface(s) state, a mechanical interface(s) state and/or the like. The sensory data may be assigned and/or associated with spatiotemporal data relating to the operational state, for example, a timing (time, order, sequence, etc.), a location and/or the like.

The sensory data may be analyzed in particular with respect to the detected usage event(s) in order to correlate the detected usage event(s) with the identified operational state of the physical interface(s) of the used client terminal(s) to evaluate whether the detected usage event(s) is valid or invalid in which case the invalid usage event(s) may present a potential (cyber) security threat. The evaluation may be based on one or more validation rules, predefined operational state rules and/or learned operational state rules. For example, the validation rule(s) may define whether the identified operational state, in particular a change in the operational state of the physical interface(s) of the used client terminal(s) may be indicative of the detected usage during the usage event(s). In another example, comparing between the identified operational state and the predefined operational state rule(s) and/or the learned operational state rule(s) may allow determining whether the usage event(s) is valid or not.

Based on to the validation outcome, one or more actions may be initiated, for example, generating an alert to one or more users and/or automated systems, preventing the usage at the used client terminal(s), preventing the access to the accessed network resource(s), invoking a deception measure to contain the invalid usage event, deceive an unauthorized using party and/or the like.

Figure 2:
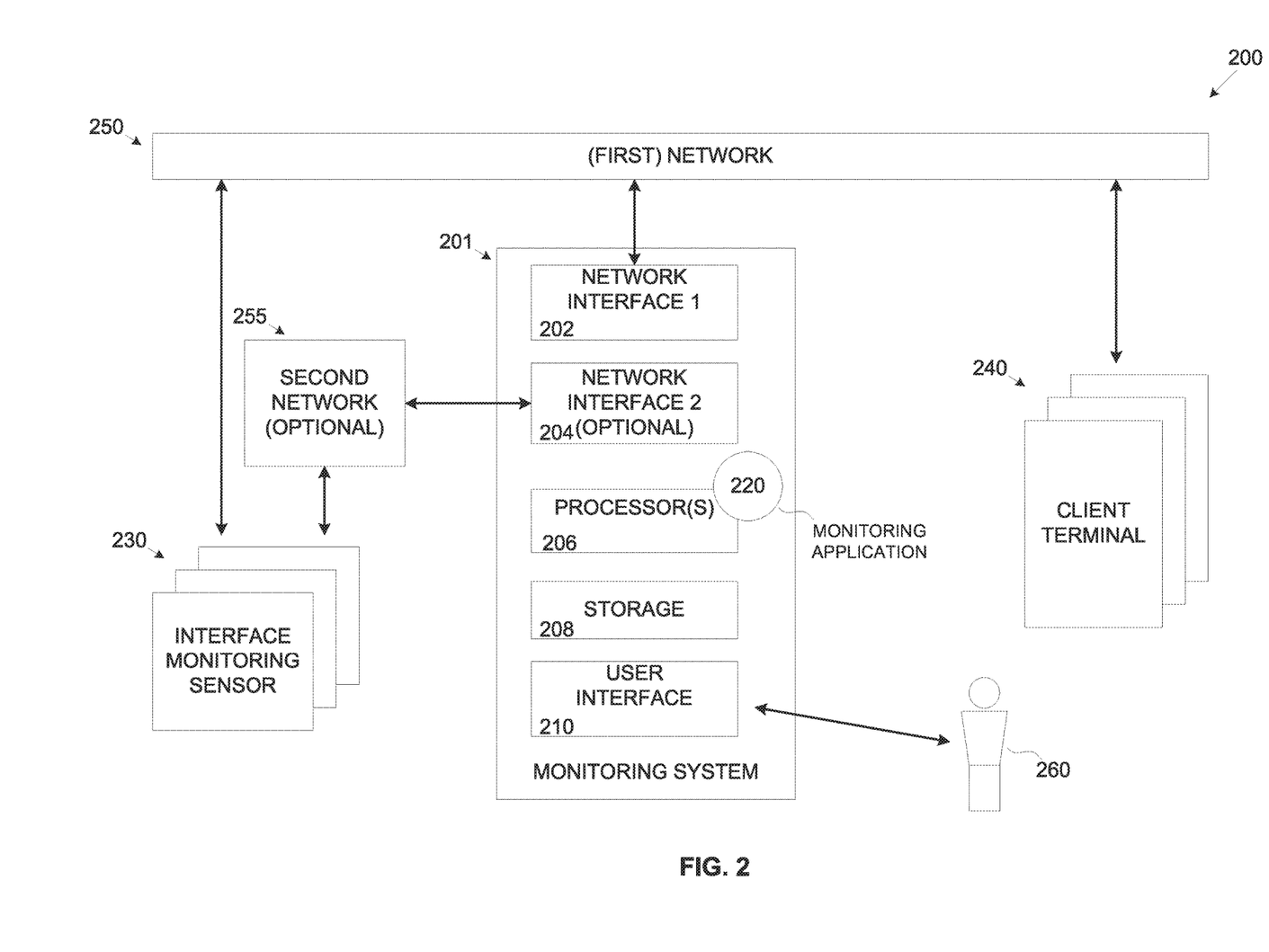
FIG. 2 is a schematic illustration of an exemplary system for correlating between usage events indicative of using client terminals in a monitored location and an operational state of physical interfaces of the client terminals, according to some embodiments of the present invention.

Reference is also made to FIG. 2, which is a schematic illustration of an exemplary system for correlating between usage events indicative of using client terminals in a monitored location and an operational state of physical interfaces of the client terminals, according to some embodiments of the present invention. An exemplary system 200 for executing a process such as the process 100 may comprise a plurality of client terminals 240, for example, a processing node, a computer, a laptop, a server, a mobile device (e.g. a tablet, a cellular device, a Smartphone, etc.), and/or any processing device having one or more processor.

The plurality of client terminals 240 may connect to a (first) network 250 comprising one or more wired and/or wireless networks, for example, a Local Area Network (LAN) and/or the like. The network 250 may further include additional networks, for example, a Wide Area Network (WAN), a Personal Area Network (PAN), a Metropolitan Area Network (MAN) and/or the internet to facilitate communication with more or more internal and/or external network resources, for example, a storage resource, a service, a router, a gateway, a printer and/or the like which are located on-site and/or off-site the monitored location respectively. The physical location of the client terminals 240 may be mapped such that their location in the monitored location is known.

The system 200 further includes a monitoring system 201, for example, a server, a processing node, a cluster of processing nodes and/or the like which comprises a first network interface 202 for connecting to the network 250, an optional second network interface 204 for connecting to an optional second network 255, a processor(s) 206 and storage 208. The processor(s) 206, homogenous or heterogeneous, may include one or more processors arranged for parallel processing, as clusters and/or as one or more multi core processor(s). The storage 208 may include one or more non-transitory persistent storage devices, for example, a hard drive, a Flash array and/or the like. The storage 208 may further comprise one or more network storage devices, for example, a storage server, a network accessible storage (NAS), a network drive, and/or the like.

The storage 208 may also include one or more volatile devices, for example, a Random Access Memory (RAM) component and/or the like. The storage 208 may store one or more software modules, for example, an OS, an application, a tool, an agent, a service, a script and/or the like each comprising a plurality of program instructions that may be executed by the processor(s) 206 from the storage 208. The processor(s) 206 may execute a monitoring application 220 for monitoring and validating usage events indicative of using the client terminal(s) 240.

Optionally, the monitoring system 201 is utilized by one or more remote platforms, for example, a remote server, a cloud computing platform, such as, for example, Amazon Web Service (AWS), Google Cloud, Microsoft Azure and/or the like. Additionally, and/or alternatively, the monitoring application 220 may be implemented as one or more remote services, a remote service, a cloud service, Software as a Service (SaaS), a Platform as a Service (PaaS) and/or the like.

One or more interface monitoring sensors 230, for example, an imaging sensor, an acoustic sensor, an HMI monitoring sensor, an I/O interface monitoring sensor, a mechanical interface monitoring sensor and/or the like may be deployed to monitor the monitored location. The interface monitoring sensor(s) 230 may be configured to capture an operational state, in particular changes in the operational state of one or more physical interfaces of one or more of the client terminals 240, for example, the HMI interface(s), the I/O interface(s), the mechanical interface(s) and/or the like.

For example, the imaging sensor(s) may be configured to capture one or more images depicting a visual indication of the operational state of one or more of the physical interfaces. In another example, the acoustic sensor may be configured to capture a sound indicative of the operational state of one or more of the physical interfaces. In another example, the HMI monitoring sensor(s) may be configured to capture the operational state of one or more of the HMI interfaces. In another example, the I/O interface monitoring sensor(s) may be configured to capture the operational state of one or more of the I/O interfaces. In another example, the mechanical interface monitoring sensor(s) may be configured to capture the operational state of one or more of the mechanical interfaces.

Deployment of the interface monitoring sensors 230 in the monitored location may utilize a plurality of implementation which may depend on the type and/or capabilities of each of the interface monitoring sensors 230. For example, one or more imaging sensor(s) may be deployed in one or more location(s) in the monitored location from which the physical interface(s) of the client terminal(s) 240 is visible. In another example, one or more acoustic sensor(s) may be deployed in one or more location(s) in the monitored location from which the sound of interaction with the physical interface(s) of the client terminal(s) 240 can be captured.

Optionally, one or more of the interface monitoring sensors 230 may be integrated in one or more respective physical interfaces. For example, one or more HMI interface monitoring sensors may be integrated in the respective HMI interface(s), for example, in the keyboard, in the pointing device and/or the like. In another example, one or more I/O interface monitoring sensors may be integrated in the respective I/O interface(s), for example, in a USB port, in a communication port, in a network port and/or the like.

In another example, one or more mechanical interface monitoring sensors may be integrated in the respective mechanical interface(s), for example, in a server door, in a rack drawer, in a laptop lid and/or the like. Spatial information of the interface monitoring sensor(s) 230 may be available, in particular a physical location of the interface monitoring sensor(s) 230 may be mapped such that their location in the monitored location is known. The spatial information may further include, for example, an elevation, an orientation, a Field of View (FOV), a range, a resolution and/or any other locational data for each interface monitoring sensors.

The programming (software) of the interface monitoring sensor(s) 230 may be protected such that it may not be reprogrammed after deployed in the monitored location. This means that once deployed, operation of the interface monitoring sensor(s) 230 may not be modified, altered and/or changed. As such the interface monitoring sensor(s) 230 may be highly protected against (cyber) attacks which may attempt to change, manipulate, degrade and/or damage the operation of the interface monitoring sensor(s) 230. For example, the interface monitoring sensor(s) 230 may be a Programmable ROM (PROM) device which may not be field programmable. Such interface monitoring sensor(s) 230 may be programmed off-line using special tool(s), special access modes and/or the like.

Since the interface monitoring sensor(s) 230 may connect to the monitoring system 201 through the network 250, the interface monitoring sensor(s) 230 may employ one or more secure and/or encrypted communication protocols, for example, a public key authentication and/or the like in order to authenticate validity of the data transmitted to/from the interface monitoring sensor(s) 230. This may prevent potential attacker(s), for example, a malicious user, a malicious automated tool (e.g. agent, tool, script, application, etc.) and/or the like, from bypassing the interface monitoring sensor(s) 230, impersonating as the interface monitoring sensor(s) 230 (e.g. a man in the middle attack vector, etc.) and/or the like in order to send false sensory data to the monitoring system 201.

Optionally, the interface monitoring sensor(s) 230 may employ a proprietary communication protocol utilizing the hardware infrastructure of the network 250. The proprietary communication protocol may significantly prevent unauthorized access to the interface monitoring sensor(s) 230. For example, assuming the network 250 is a LAN, the data transmitted between the interface monitoring sensor(s) 230 and the monitoring system 201 may be encoded according to the proprietary communication protocol, for example, proprietary data packets which do not follow standard and/or common network protocols such as, for example, TCP/IP.

Optionally, in order to maintain isolation between the interface monitoring sensors 230 and the client terminal 240 (and/or the network resources), the interface monitoring sensors 230 may connect to the optionally available network 255 which may be physically isolated, for example, segregated, separated and/or independent of the (first) network 250. The second network 255 may comprise one or more interfaces, networks, buses and/or interconnections provided by the optional second network interface 204 of the monitoring system 201, for example, a Radio Frequency (RF) interface, a Bluetooth interface, a Wireless LAN (WLAN, e.g. Wi-Fi) interface, a CAN bus interface, a serial interface, a single wire interface and/or the like. The interface monitoring sensors 230 may utilize a point to point connection with the second network interface 204. Additionally and/or alternatively, one or more of the interface monitoring sensors 230 may share one or more networks, buses, links and/or the like of the second network 255.

While one or more of the interface monitoring sensors 230 may directly connect and/or communicate with the monitoring system 201 through the second network 255, one or more of the interface monitoring sensors 230 may communicate its sensory data and/or operational state indication indirectly to the monitoring system 201 through one or more other activity sensors 230 and/or through one or more relaying devices.

This means that a certain interface monitoring sensor 230 may generate an indication of the operational state of a respective physical interface, for example, a visual indication, an audible indication, an RF indication and/or the like. The generated indication may be captured by one or more other interface monitoring sensors 230 and/or relaying devices which may be directly connected to the monitoring system 201. The other interface monitoring sensor(s) 230 and/or relaying device(s) may then forward (relay) the operational state indication to the monitoring system 201.

For example, a certain interface monitoring sensor 230 may be configured to generate a visual indication indicative of the operational state of a respective physical interface, for example, flashing a Light Emitting Diode (LED) when the respective physical interface is active. The flashing of the LED may be captured by one or more other interface monitoring sensor 230, for example, an imaging sensor which may be directly connected to the monitoring system 201 through the second network 255, for example, a Wi-Fi connection. The imaging sensor(s) may thus forward the generated indication from the certain interface monitoring sensor 230 to the monitoring system 201. In another example, a certain interface monitoring sensor 230 may be configured to generate an audible indication indicative of the operational state of a respective physical interface, for example, a beep sound when a change is detected in the operational state of the respective physical interface.

The beep sound may be intercepted by one or more other interface monitoring sensor 230, for example, an acoustic sensor which may be directly connected to the monitoring system 201 through the second network 255, for example, a CAN bus. The acoustic sensor(s) may thus forward the generated indication from the certain interface monitoring sensor 230 to the monitoring system 201. In another example, a certain interface monitoring sensor 230 may be configured to generate an RF signal indicative of the operational state of a respective physical interface, for example, a state change Bluetooth message.

The Bluetooth message may be captured by one or more other interface monitoring sensor 230 and/or relaying devices, for example, a Bluetooth receiver integrated in the other interface monitoring sensor(s) 230 which may be directly connected to the monitoring system 201 through the second network 255, for example, LAN. The Bluetooth receiver(s) may thus forward the state change Bluetooth message from the certain interface monitoring sensor 230 to the monitoring system 201.

Optionally, the monitoring system 201 includes a user interface 210 for interacting with one or more user 260, for example, an Information Technology (IT) officer, an administrator, an operator and/or the like. The user interface 210 may include one or more human-machine interfaces, for example, a keyboard, a pointing device, a touch pad, a display, a touch screen, an audio interface and/or the like for interacting with the user(s) 260. For example, the user interface 208 may be used to present the user(s) 260, for example, a Graphic User Interface (GUI) utilized through one or more of the human-machine interfaces. Naturally, in case the monitoring system 201 is implemented through the remote platform(s) and/or the remote service(s), the monitoring system 201 may be accessible from one or more client terminals using one or more access agents, for example, a web browser, a proprietary local agent of the remote service and/or the like.

As shown at 102, the process 100 starts with the monitoring application 220 monitoring network activity and/or traffic on the network 250 to detect usage events indicative of a usage of one or more of the client terminals 240. By analyzing the activity and/or traffic on the network 250 the monitoring application 220 may detect one or more usage events, for example, a login attempt, installation of a software module, manual interaction with the HMI interface(s) of the client terminal 240 and/or the like. The monitoring application 220 may further monitor computation resources utilization at one or more of the client terminals 240 to detect a change, in particular an increase in the computing resources utilization at one or more of the client terminal 240 which may be indicative of the usage event.

The monitoring application 220 may further analyze the activity and/or traffic on the network 250 to detect access events to accesses one or more of the network resources via one or more of the client terminals 240, for example, accessing a storage resource, accessing a computation resource, accessing a service, accessing an application, using a printer and/or the like. For example, the monitoring application 220 may detect usage of one or more of the client terminals 240 to access a database to retrieve information stored in the database. In another example, the monitoring application 220 may detect usage of one or more of the client terminals 240 to access a human resources service to retrieve personal information.

In addition to analyzing the activity and/or traffic on the network 250, the monitoring application 220 may detect the usage event(s) using one or more monitoring techniques facilitated in the client terminals 240. For example, one or more agents may be installed and executed in the client terminal(s) 240 which may generate an indication, for example, a message to the monitoring application 220 whenever such usage event is detected at the respective client terminal(s) 240. Optionally, the monitoring application 220 continuously and/or periodically probes the client terminal(s) 240 to detect the usage event(s). For example, the monitoring application 220 may probe an activity log that may be maintained by one or more of the client terminal(s) 240 to log usage events at the respective client terminal 240.

The monitoring application 220 may associate the detected usage event(s) with spatiotemporal data. The monitoring application 220 may assign the spatial data to the detected usage event(s) according to the spatial information, for example, a location in the monitored location of the accessed client terminal(s) 240. With respect to temporal data, the monitoring application 220 may associate the detected usage event with timing data, for example, time tag(s) obtained from the accessed client terminal(s) 240 and/or assigned at the time of detection by the monitoring application 220.

As shown at 104, the monitoring application 220 may obtain sensory data from one or more of the interface monitoring sensors 230. The monitoring application 220 may continuously and/or periodically collect the sensory data. Additionally and/or alternatively, the monitoring application 220 may collect the sensory data from the interface monitoring sensor(s) 230 following the detection of the usage event(s). The sensory data may comprise the operational state of one or more physical interfaces of one or more of the client terminals 240, for example, the HMI interface, the I/O interface, the mechanical interface and/or the like.

Naturally, the collected sensory data depends on the type of the interface monitoring sensor(s) 230. For example, the interface monitoring sensor(s) 230 may include one or more of the imaging sensors, for example, a camera, an infrared sensor, a night vision sensor and/or the like. In such case, the sensory data provided by the imaging sensor(s) may one or more images of the monitored physical interface(s).

In another example, the interface monitoring sensor(s) 230 may include one or more of the acoustic sensors, for example, a microphone, a piezoelectric sensor, a sound wave sensor and/or the like. In such case, the sensory data captured by the acoustic sensor(s) may include sounds and/or noise.

In another example, the interface monitoring sensor(s) 230 may include one or more HMI monitoring sensors configured to capture the operational state of the HMI interface(s) of the client terminal(s) 240, for example, a keyboard state (e.g. active when keys are pressed, inactive when idle), a pointing device state (e.g. active when pointing device moved, inactive when idle) and/or the like. In such case, the sensory data may include operational state data in particular changes in the operational state as captured by the HMI monitoring sensor(s), for example, keyboard typing actions, mouse movement(s) and/or the like.

The sensory physical interaction data provided by the HMI monitoring sensor(s) may further include the data inserted to the HMI interface(s), for example, a string of the characters pressed on the keyboard, coordinates of movement of the mouse and/or the like.

In another example, the interface monitoring sensor(s) 230 may include one or more I/O interface monitoring sensors configured to capture the operational state of the I/O interface(s) of the client terminal(s) 240, for example, detection of presence, insertion and/or ejection of a cable plug in the I/O interface(s), detection of presence, insertion and/or ejection of a peripheral device in the I/O interface(s) and/or the like. In such case, the sensory data may include the present operational state of the respective I/O interface(s) and/or changes in the operational state of the respective I/O interface(s), for example, presence, insertion and/or ejection of the cable plug, presence, insertion and/or ejection of the peripheral device and/or the like.

In another example, the interface monitoring sensor(s) 230 may include one or more mechanical interface monitoring sensors configured to capture the operational state of the mechanical interface(s) of the client terminal(s) 240, for example, a rack drawer state, a server door state, a laptop lid state and/or the like. In such case, the sensory physical interaction data may include the present operational state of the respective mechanical interface(s) and/or changes in the operational state of the respective mechanical interface(s), for example, server door open/close, rack drawer open/close, laptop lid open/close and/or the like.

The sensory data may typically be assigned and/or associated with temporal information assigned by one or more of the interface monitoring sensors 230. For example, one or more of the interface monitoring sensors 230 may assign a time tag to the captured sensory data, for example, in a metadata record associated with the respective captured physical interaction data. Additionally and/or alternatively, the monitoring application 220 assigns the time tag to the captured sensory data at the time of reception at the monitoring application 220.

As shown at 106, the monitoring application 220 analyzes the obtained sensory data, for example, extracts, analyzes, infers, manipulate and/or the like to identify the operational state of one or more of the physical interfaces of one or more of the client terminals 240. Naturally, the analysis conducted by the monitoring application 220 is adapted to the type of the sensory data and/or the type of the interface monitoring sensor(s) 230 which provides the sensory data.

For example, assuming the sensory physical interaction data comprises images captured by one or more of the imaging sensors, the monitoring application 220 may apply one or more image processing and/or computer vision tools, techniques and/or algorithms as known in the art to identify visually the operational state of one or more of the physical interfaces of the client terminal(s) 240. For example, the monitoring application 220 may use image processing, computer vision and/or machine learning algorithms to identify typing on the keyboard, moving the pointing device, interacting with a touchscreen, attaching/detaching a peripheral device, a cable plug and/or the like to the I/O interface(s), opening/closing a server door, opening/closing a rack drawer, opening/closing a laptop lid and/or the like.

In another example, the monitoring application 220 may apply one or more audio and/or acoustics analysis tools, techniques and/or algorithms as known in the art to identify the sound and/or noise captured by one or more of the acoustic sensors to identify sound and/or noise indicative of the physical interaction of the person(s) with the interface(s) of the client terminal(s) 240. For example, the monitoring application 220 may analyze the sensory data provided by the acoustic sensor(s) to identify a sound and/or noise to sound indicative of the operational state of respective physical interface(s) of the client terminal(s) 240, for example, a sound of typing on a keyboard (i.e. the keyboard is active), a sound of cable plug insertion/ejection to the I/O interface(s), a sound of a peripheral device insertion/ejection to the I/O interface(s), a sound of a mechanical operation to the mechanical interface(s) (e.g. a server door open/close, a rack drawer open/close a laptop lid open/close, etc.) and/or the like.

In another example, the monitoring application 220 may analyze operational state indication messages received from one or more of the interface monitoring sensor(s) 230, for example, the HMI interface(s) monitoring sensor, the I/O interface monitoring sensor and/or the mechanical interface monitoring sensor. For example, a keyboard sensor type of HMI interface monitoring sensor configured to monitor a keyboard of a certain client terminal 240 may generate an active operational state message to the monitoring application 220 when detecting keyboard key(s) pressing.

The keyboard sensor may further send to the monitoring application 220 a string identifying the keys pressed at the keyboard. In another example, a mouse sensor type of HMI interface monitoring sensor configured to monitor a mouse of a certain client terminal 240 may generate an active operational state message to the monitoring application 220 when detecting movement of the mouse. The mouse sensor may further send to the monitoring application 220 coordinates of the mouse movement and/or indication(s) of the pressed mouse button(s).

In another example, a USB port sensor type of I/O interface monitoring sensor configured to monitor a certain USB port of a certain client terminal 240 may generate a USB device presence, attachment and/or detachment message(s) when detecting such events. In another example, a LAN port sensor type of I/O interface monitoring sensor configured to monitor a certain LAN port of a certain client terminal 240 may generate a LAN cable plug presence, attachment and/or detachment message(s) when detecting such events. In another example, a server door sensor type of mechanical interface monitoring sensor configured to monitor open/close state of a certain server door of a certain client terminal 240 may generate open/close message(s) when detecting such events.

The monitoring application 220 may further analyze the collected sensory data to identify the operational state of one or more of the client terminals 240. For example, the monitoring application 220 may analyze one or more images obtained from one or more of the imaging sensors capturing a display type of HMI interface of a certain client terminal 240. The monitoring application 220 may analyze the image(s) to identify contents presented on the display. Based on the identified content on the display, the monitoring application 220 may identify one or more attributes of the operational state of the certain client terminal 240, for example, a login screen, a software installation progress bar and/or the like.

Naturally, the operational state of one or more of the physical interfaces may be identified by aggregating sensory data provided by multiple interface monitoring sensors 230 of the same and/or of different types to increase accuracy and/or reliability of the identified operational state. For example, the monitoring application 220 may collect acoustic sensory data from one or more of the acoustic sensors and HMI interaction sensory data from one or more of the HMI interface monitoring sensors.

Based on analysis of the acoustic sensory physical interaction data, the monitoring application 220 may identify the sound of keyboard typing at a keyboard of a certain client terminal 240 and determine the keyboard is in active operational state. Based on analysis of the HMI interaction sensory data, the monitoring application 220 may identify one or more keys are pressed on the keyboard of the certain client terminal 240 and determine the keyboard is in active operational state. The monitoring application 220 may aggregate, combine and/or complement the identified operational state derived from the sensory data received from both sources to increase the reliability of the detection and/or reduce a probability for false detection.

The monitoring application 220 may associate the identified operational state with the spatiotemporal information, in particular with respect to the spatial information of the client terminal(s) 240 in order to associate the identified operational state with the physical interface(s) of specific client terminal(s) 240. The monitoring application 220 may assign the spatial data to the identified operational state according to the location (in the monitored location) of the respective interface monitoring sensor(s) 230 which provided the sensory physical interaction data. As for the temporal data, the monitoring application 220 may associate the identified operational state with temporal data according to temporal data, for example, the time tag(s) obtained from the respective interface monitoring sensor(s) 230 which provided the sensory data and/or assigned at the time of reception by the monitoring application 220, for example, a time (timing), duration and/or the like.

As shown at 108, the monitoring application 220 correlates between the detected usage event(s) and the identified operational state of the physical interface(s) of the used client terminal(s) 240 in order to evaluate the validity of the detected usage event(s). Since spatiotemporal data is available for the detected usage event(s), the monitoring application 220 may determine the physical location of the used client terminal(s) 240 and the timing of the usage event(s). Similarly, the monitoring application 220 may determine the physical location of the physical interface(s) to which the identified operational state relates as well as the timing relating to the current and/or changes in the operational state.

Based on a comparison of the spatiotemporal data associated with the detected usage event(s) and the spatiotemporal data associated with the identified operational state(s) of the respective relevant physical interface at the used client terminal(s), the monitoring application 220 may correlate between the detected usage event(s) and the identified operational state. Based on the correlation between the, the monitoring application 220 may evaluate the validity of the detected usage event(s) according to one or more validation rules.

The validation rules may define whether the identified operational state of the physical interface(s) may be indicative of the correlated detected usage event(s), i.e. whether the usage associated with the correlated usage event(s) can be actually conducted while the relevant physical interface(s) are at their identified operational state or whether the identified operational state does not allow the usage associated with the detected usage event(s). The validation rule(s) may also define whether the usage associated with the detected usage event(s) may affect the physical interface(s) of the used client terminal(s) 240 to be and/or enter (switch to) the identified operational state.

The validation rules may define positive and/or negative correlation of the detected usage event(s) with the identified operational state. Negative correlation means that the monitoring application 220 cannot correlate between a certain usage event and the operational state of a corresponding (relevant) physical interface(s) of the used client terminal(s) 240. Such negative correlation may be indicative that the certain usage event is initiated from a remote location and/or by an automated application executing at the used client terminal(s) 240 and the certain usage event may therefore present a potential security threat.

Positive correlation means that the monitoring application 220 is able to correlate between the certain detected usage event and the operational state of a corresponding (relevant) physical interface(s) of the used client terminal(s) 240. The monitoring application 220 may further analyze the correlated operational state to evaluate whether the operational state of the physical interface(s) of the used client terminal(s) is out of ordinary, suspicious and/or unauthorized which may be indicative of a potential security threat.

For example, assuming a certain detected usage event relates to a login attempt to log into a certain client terminal 240, i.e. a password typing. Naturally, in order to type the password, one or more HMI interfaces of the certain client terminal 240 must be operated, for example, the keyboard, the touchscreen and/or the like. One or more of the validation rules may define that in case the operational state of the operated HMI interface(s) is active (e.g. keyboard keys are pressed, touchscreen is interacted with, etc.), the login usage event may be valid. On the other hand, one or more of the validation rules may define that in case the operational state of the operated HMI interface(s) is inactive (e.g. keyboard keys not pressed, touchscreen is not interacted with, etc.), the login usage event may be invalid and may be conducted from a remote location and/or by an automated application executing at the used client terminal(s) 240.

In another example, a certain detected usage event may relate to an authentication action to access a respective client terminal 240, for example, pressing a confirmation key on the keyboard (e.g. "Y/y"), checking a check box with the pointing device (e.g. clicking with the mouse) and/or the like. The validation rule(s) may define that in case the operational state of the keyboard is active, the authentication action may be valid. On the other hand, the validation rule(s) may define that in case the operational state of the keyboard is inactive, the authentication action may be invalid.

In another example, assuming the detected usage event is an increase in utilization of computing resources in a certain client terminal 240. Such increase in the computing resources of the certain client terminal 240 may be indicative of one or more applicative operations, for example, launching and/or installing an application from a peripheral storage device inserted to a certain I/O interface such as, for example, the USB port, the LAN port and/or the like. The validation rule(s) may therefore define a correlation between such applicative operation(s) and an active operational state of the relevant I/O interface(s), e.g., the USB port, the LAN port, etc.

Further assuming the monitoring application 220 cannot correlate between the detected applicative operation and an active operational state identified for the relevant I/O interface of the certain used client terminal 240. In such case the monitoring application 200 may evaluate and/or determine that the detected applicative operation is invalid as it may be triggered by one or more automated applications executed on the accessed client terminal 240 with no local human intervention (physical interaction).

In another example, assuming a certain detected usage event relates to a login attempt to log into a certain client terminal 240. One or more of the validation rules may define that in case the operational state of the related display HMI interface(s) is active, for example, a login screen is presented on the display, the login usage event may be valid. On the other hand, one or more of the validation rules may define that in case the operational state of the operated HMI interface(s) is inactive (for example, a login screen is not presented on the display, the login usage event may be invalid and may be conducted from a remote location and/or by an automated application executing at the used client terminal(s) 240.

The validation rules may further include one or more operational state rules which may be predefined for the monitoring application 220 by the user(s) 260. The monitoring application 220 may evaluate the validity of the detected usage event(s) by comparing the identified operational state to the predefined operational state rule(s). By comparing the identified physical interaction to the predefined operational state rules, the monitoring application 220 may identify unordinary operational state of the physical interface(s) which may be indicative of a potential unauthorized usage triggering the usage event.

In case the monitoring application 220 determines that the operational state of the physical interface(s) of the client terminal(s) 240 correlated with the detected usage event(s) does not comply with the predefined operational state rules, the monitoring application 220 may evaluate that the detected usage event(s) is invalid and may present a security threat.

For example, the predefined operational state rule(s) may dictate that one or more of the I/O interfaces of a certain client terminal 240, for example, the USB port, the LAN port and/or the like are restricted and/or not allowed for use, for example, may only be used under certain supervision measures, by a certain user 260 and/or the like. In case the monitoring application 220 identifies an active operational state for a certain restricted and/or prohibited I/O interface, the monitoring application 220 may determine that an unauthorized operation is conducted with the certain restricted I/O interface which may present a potential security threat.

In another example, the predefined operational state rule(s) may dictate that one or more of the mechanical interfaces of a certain client terminal 240, for example, the server door, the storage rack drawer and/or the like are restricted and/or must not be used and/or accessed. In case the monitoring application 220 identifies an active operational state for a certain restricted and/or prohibited for use mechanical interface, the monitoring application 220 may determine that an unauthorized operation is conducted with the certain restricted mechanical interface which may present a potential security threat.

Optionally, the monitoring application 220 applies one or more machine learning methods, techniques and/or algorithms to constantly evolve and learn the validation rules and/or the operational state rules. The machine learning algorithms may be applied to track the detected usage events(s) in the monitored location over time and identify typical correlation patterns between the operational state identified for the physical interface(s) and the detected usage event(s). Such operational state patterns, in particular correlated with certain usage event(s) may be considered by the monitoring application 220 as legitimate (valid) access events. Moreover, the machine learning algorithms may be applied to analyze security breach events and correlate between the usage events associated with the security breach(s) and the operational state of the relevant physical interface(s) of the breached client terminal(s) 240.

As shown at 110, based on the validity determination, in case the detected usage event(s) are estimated to be invalid, the monitoring application 220 may initiate one or more actions, for example, generate an alert to indicate one or more parties of the detected potentially invalid usage event(s). The monitoring application 220 may generate the alert to one or more persons, for example, an IT officer, a system administrator, a security person and/or the like. Additionally and/or alternatively, the monitoring application 220 may generate the alert to one or more automated systems, for example, a security system, a Security Operations Center (SOC), a Security Information and Event Management (SIEM) system and/or the like. Additionally and/or alternatively, the monitoring application 220 may initiate one or more additional actions, for example, preventing the usage of the used client terminal(s) 240, preventing the access to the accessed network resource(s), invoking a deception measure to mislead and/or contain the potentially malicious usage relating to the detected usage event(s) and/or the like.

In some embodiments of the present invention, the monitored location may be an interior space (cabin) of a vehicle, for example, a car, a boat and/or the like. A monitoring application such as the monitoring application 220 may be executed by a monitoring system such as the monitoring system 201 deployed in the vehicle.

As described in step 102, the monitoring application 220 may monitor activity of the network 250, for example, a CAN bus and/or the like connecting one or more vehicle systems which may be referred to as the client terminals 240, for example, a vehicle control system, a driving control system, a navigation system and/or the like. By analyzing the activity of the network 250, the monitoring application 220 may detect one or more usage events relating to usage of the vehicle system(s).

One or more interface monitoring sensors such as the interface monitoring sensors 230, for example, the imaging sensor, the acoustic sensor, the HMI interface monitoring sensor, the I/O interface monitoring sensor, the mechanical interface monitoring sensor and/or the like may be deployed in the vehicle. The interface monitoring sensors 230 may be deployed to capture an operational state of one or more physical interfaces of the vehicle, for example, a touchscreen, a driving control interface (e.g. steering wheel buttons, a light lever, an acceleration pedal, a breaking pedal etc.).

As described in step 104, the monitoring application 220 may obtain sensory data from the interface monitoring sensor(s) 230 and analyze the sensory data to identify the operational state of the physical interfaces of the vehicle.

As described in step 106, the monitoring application 220 may analyze the sensory data to identify the operational state of the physical interfaces of the vehicle.

As described in step 108, the monitoring application 220 may correlate between the detected usage event(s) and the operational state of the physical interfaces of the vehicle in order to evaluate whether the detected usage event(s) is valid or not, i.e. whether the usage event(s) relate to usage of the vehicle system(s) by a driver and/or passenger in the vehicle who may manipulate the physical interfaces. The monitoring application 220 may apply one or more of the validation rules to evaluate and/or determine whether the detected usage event(s) is valid or not.

In case of positive correlation, i.e. the operational state of the physical interfaces of the vehicle is indicative and/or complaint with the detected usage event, the monitoring application may determine that the detected usage event related to valid, legitimate usage of the vehicle system(s). However, in case the monitoring application 220 is unable to correlate between the detected usage event(s) and the operational state of the physical interface(s) of the vehicle, the monitoring application 220 may determine that the usage event(s) is invalid. Such invalid usage event may be triggered from a remote location and/or by one or more automated applications, agents, tools and/or the like executing in the vehicle system(s) which may be indicative of malicious usage and potentially a security threat.

For example, assuming a certain detected usage event relates to instructing the vehicle control system to accelerate. Naturally, in order to accelerate, one or more physical interfaces of the vehicle may need to be manipulated, for example, the acceleration pedal, the cruise control acceleration button and/or the like. Therefore, one or more of the validation rules may define that the acceleration instruction is associated with a certain operational state of the respective physical interface(s) of the vehicle, for example, the acceleration pedal is active (i.e. pressed down), the cruise control acceleration button is active (i.e. pressed) and/or the like. In case the identified operational state of the acceleration pedal and/or the cruise control acceleration button is active, the monitoring application 220 may be able to correlate between the identified operational state and the detected acceleration usage event and thus evaluate the acceleration usage event as valid.

However, in case the operational state of the acceleration pedal and/or the cruise control acceleration button is identified as inactive, the monitoring application 220 may determine that the detected acceleration usage event is invalid and potentially malicious.

In another example, assuming a certain detected usage event relates to inserting an address to the navigation system of the vehicle and instructing the vehicle to drive to that address. Naturally, in order to insert the address to the navigation system, one or more physical interfaces of navigation system, for example, the touchscreen, a voice interface (e.g. a microphone) and/or a keyboard are manipulated.

Therefore, one or more of the validation rules may define that the address insertion and driving instruction is associated with a certain operational state of the respective physical interface(s) of the navigation system, for example, the touchscreen, the microphone and/or the keyboard. In case the identified operational state of the touchscreen, the microphone and/or the keyboard is active, the monitoring application 220 may be able to correlate between the identified operational state and the detected address insertion and driving instruction usage event and thus evaluate the usage event as valid. However, in case the operational state of the touchscreen, the microphone and/or the keyboard is identified as inactive, the monitoring application 220 may determine that the detected address insertion and driving instruction usage event is invalid and potentially malicious.

As described above in step 110, in case the monitoring application 220 determines and/or evaluates that the detected usage event(s) is invalid, the monitoring application 220 may initiate one or more actions. For example, the monitoring application 220 may generate an alert to the driver, generate an alert to one or more remote persons, for example, a vehicle fleet officer, a cyber security person and/or the like. Additionally and/or alternatively, the monitoring application 220 may generate the alert to one or more automated systems, for example, the security system, the SOC, the SIEM system and/or the like. Additionally and/or alternatively, the monitoring application 220 may initiate one or more additional actions, for example, prevent the usage of the used vehicle system(s), invoke a deception measure to mislead and/or contain the potentially malicious usage relating to the detected usage event(s) and/or the like.

It is expected that during the life of a patent maturing from this application many relevant systems, methods and computer programs will be developed and the scope of the terms interface monitoring sensor and usage event are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of correlating between detected usage events indicative of using client terminals and an operational state of physical interfaces of said client terminals, comprising:
    monitoring a first network in a monitored location to detect at least one usage event indicating of a usage of at least one of a plurality of client terminals operatively connected to said first network;
    obtaining, via a second network isolated form said first network, sensory data from at least one interface monitoring sensor deployed to capture an operational state of at least one physical interface of said at least one client terminal, said at least one interface monitoring sensor which is independent from said at least one client terminal has a fixed operation which is unmodifiable after said deployment;
    analyzing said sensory data to identify said operational state of said at least one physical interface;
    correlating between said at least one usage event and said identified operational state to evaluate whether said at least one usage event is valid while said at least one physical interface is in said identified operational state; and
    initiating at least one action according to said validation.

2. The computer implemented method of claim 1, further comprising said at least one interface monitoring sensor employs at least one secure communication protocol to authenticate a validity of said sensory data.

3. The computer implemented method of claim 1, further comprising said at least one interface monitoring sensor employs at least one proprietary communication protocol.

4. The computer implemented method of claim 1, wherein said correlation is done by comparing spatiotemporal data relating to said at least one usage event with said spatiotemporal data relating to said identified operational state.

5. The computer implemented method of claim 4, wherein said validation is evaluated by analyzing said comparison to determine whether said identified operational state is indicative of said at least one usage event.

6. The computer implemented method of claim 1, wherein said validation is evaluated by comparing said identified operational state to at least one predefined operational state rule to determine whether said identified operational state is valid.

7. The computer implemented method of claim 1, further comprising detecting at least one usage event in which at least one network resource is accessed via said at least one client terminal, said at least one network resource is a member of a group consisting of: a network, a storage resource, a service and an application.

8. The computer implemented method of claim 1, wherein said at least one usage event is a member of a group consisting of: a login attempt to said at least one client terminal, installation of a software module on said at least one client terminal, an increase in utilization of computing resources at said at least one client terminal and an access attempt to at least one network resource.

9. The computer implemented method of claim 1, wherein said at least one physical interface comprises at least one member of a group consisting of: a Human-Machine Interface (HMI), an Input/Output (I/O) interface and a mechanical interface.

10. The computer implemented method of claim 9, wherein said at least one interface monitoring sensor is integrated in said at least one physical interface.

11. The computer implemented method of claim 1, wherein said at least one interface monitoring sensor is an imaging sensor configured to capture a visual indication of said operational state.

12. The computer implemented method of claim 1, wherein said at least one interface monitoring sensor is an acoustic sensor configured to capture a sound indicative of said operational state.

13. The computer implemented method of claim 1, wherein said at least one interface monitoring sensor is an HMI monitoring sensor configured to capture said operational state of at least one HMI interface of said at least one client terminal.

14. The computer implemented method of claim 1, wherein said at least one interface monitoring sensor is an I/O interface monitoring sensor configured to capture said operational state of at least one I/O interface of said at least one client terminal.

15. The computer implemented method of claim 1, wherein said at least one interface monitoring sensor is a mechanical interface monitoring sensor configured to capture said operational state of at least one mechanical interface of said at least one client terminal.

16. The computer implemented method of claim 1, further comprising at least some of said sensory data is received from said at least one interface monitoring sensor through at least one another sensor, said at least one interface monitoring sensor generates an indication of said identified operational state, said indication is captured by said at least one another sensor which forwards said indication.

17. The computer implemented method of claim 16, wherein said indication comprises at least one member of a group consisting of: a visual indication, an audible indication and a Radio Frequency (RF) signal indication.

18. The computer implemented method of claim 1, wherein a physical location of said at least one interface monitoring sensor is mapped in said monitored location.

19. The computer implemented method of claim 1, wherein a physical location of said at least one client terminal is mapped in said monitored location.

20. The computer implemented method of claim 1, wherein said at least one action is a member of a group consisting of: generating an alert, preventing said usage of said at least one client terminal, preventing an access to at least one network resource and invoking a deception measure.

21. A system for correlating between detected usage events indicative of using client terminals and an operational state of physical interfaces of said client terminals, comprising:
at least one interface monitoring sensor deployed in a monitored location to capture sensory data comprising an operational state of at least one physical interface of at least one of a plurality of client terminals in a monitored location, said at least one interface monitoring sensor which is independent from said at least one client terminal has a fixed operation which is unmodifiable after said deployment;
at least one processor connected to a first network connecting said plurality of client terminals and to a second network isolated form said first network to which said at least one interface monitoring sensor is operatively connected, said at least one processor is adapted to execute code, said code comprising:
code instructions to monitor said first network to detect at least one usage event indicating of a usage of at least one of said plurality of client terminals;
code instructions to obtain said sensory data from said at least one interface monitoring sensor via said second network;
code instructions to analyze said sensory data to identify said operational state of said at least one physical interface;
code instructions to correlate between said at least one usage event and said identified operational state to evaluate whether said at least one usage event is valid while said at least one physical interface is in said identified operational state; and
code instructions to initiate at least one action according to said validation.

22. A software program product correlating between detected usage events indicative of using client terminals and an operational state of physical interfaces of said client terminals, comprising:
a non-transitory computer readable storage medium;
first program instructions for monitoring a first network in a monitored location to detect at least one usage event indicating of a usage of at least one of a plurality of client terminals operatively connected to said first network;
second program instructions for obtaining, via a second network isolated form said first network, sensory data from at least one interface monitoring sensor deployed to capture an operational state of at least one physical interface of said at least one client terminal, said at least one interface monitoring sensor which is independent from said at least one client terminal has a fixed operation which is unmodifiable after said deployment;
third program instructions for analyzing said sensory data to identify said operational state of said at least one physical interface;
fourth program instructions for correlating between said at least one usage event and said identified physical operational state to evaluate whether said at least one usage event is valid while said at least one physical interface is in said identified operational state;
and fifth program instructions for initiating at least one action according to said validation;
wherein said first, second, third, fourth and fifth program instructions are executed by at least one processor from said non-transitory computer readable storage medium.

* * * * *